United States Patent
Doswald

(10) Patent No.: US 8,682,100 B2
(45) Date of Patent: Mar. 25, 2014

(54) FIELD SEQUENCE DETECTOR, METHOD AND VIDEO DEVICE

(75) Inventor: Daniel Doswald, Munich (DE)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 13/099,473

(22) Filed: May 3, 2011

(65) Prior Publication Data

US 2011/0211074 A1    Sep. 1, 2011

Related U.S. Application Data

(62) Division of application No. 11/381,234, filed on May 2, 2006, now Pat. No. 7,953,293.

(51) Int. Cl.
*G06K 9/36* (2006.01)

(52) U.S. Cl.
USPC .......................... 382/276; 345/603; 348/445

(58) Field of Classification Search
USPC .................. 382/100, 260, 276, 278, 294; 348/384.1, 443, 441, 445, 446, 448, 348/454, 456, 458, 459, 628, 607; 345/603
See application file for complete search history.

(56) References Cited

U.S. PATENT DOCUMENTS

| | | | |
|---|---|---|---|
| 5,128,747 A * | 7/1992 | Isnardi et al. | 348/470 |
| 5,182,645 A * | 1/1993 | Breeuwer et al. | 348/458 |
| 5,784,115 A | 7/1998 | Bozdagi | |
| 6,289,132 B1 * | 9/2001 | Goertzen | 382/240 |
| 6,867,814 B2 * | 3/2005 | Adams et al. | 348/448 |
| 7,250,984 B2 | 7/2007 | Nomura et al. | |
| 2002/0163595 A1 * | 11/2002 | Adams | 348/628 |
| 2006/0146187 A1 * | 7/2006 | Handjojo et al. | 348/448 |
| 2007/0171301 A1 * | 7/2007 | Tatsumi | 348/446 |
| 2007/0258014 A1 * | 11/2007 | Doswald | 348/701 |
| 2009/0196526 A1 | 8/2009 | Schmid et al. | |

FOREIGN PATENT DOCUMENTS

| | | |
|---|---|---|
| WO | 01/80559 | 10/2001 |
| WO | 2005/107255 | 11/2005 |

OTHER PUBLICATIONS

Poyten, Charles; "Digital Video and HDTV Algorithms and Interfaces"; Morgan Kaufmann, San Francisco, CA; pp. 429-443; 2003.
EP Search Report; International Patent Application No. PCT/IB2007/00122; dated Aug. 14, 2008.

* cited by examiner

*Primary Examiner* — Anand Bhatnagar
(74) *Attorney, Agent, or Firm* — Faegre Baker Daniels LLP

(57) ABSTRACT

A field sequence detector determines the field sequence of a series of fields of video by assessing the vertical frequency content of hypothetical de-interlaced images. Hypothetical images are formed from a currently processed field and an adjacent (e.g. previous or next) field. If the vertical frequency content is relatively high (e.g. above ½ the Nyquist frequency for the image), the hypothetical image is assessed to be formed of improperly interlaced fields, belonging to different frames. If the frequency content is relatively low, the hypothetical image is assessed to be properly assembled from fields of the same frame. The field sequence in the series of fields may be detected from the assessed frequency content for several of said series of fields. Known field sequence, such as 3:2 pull-down, 2:2 pull down, and more generally m:n:l:k pull-down sequences.

15 Claims, 8 Drawing Sheets

Complete Match

Noisy image but still no strong weave patterns

Strong weave on otherwise matching image

Strong weave on noisy image

FIELD SEQUENCE DETECTOR, METHOD AND VIDEO DEVICE

CROSS-REFERENCE TO RELATED APPLICATIONS

This application is a divisional of co-pending U.S. patent application Ser. No. 11/381,234, filed May 2, 2006, having as inventor Daniel Doswald, and owned by instant Assignee, the contents of which are hereby incorporated herein by reference.

FIELD OF THE INVENTION

The present invention relates generally to video devices and more particularly to a field sequence (e.g. 3:2/2:2 pull-down) detector.

BACKGROUND OF THE INVENTION

Moving pictures are stored as video. The moving pictures represent a sequence of still images, that when displayed give the appearance of motion. The images may be stored as "frames" or "fields". A frame represents a single still image. By contrast, a field typically represents every second horizontal line (or row) in a still image. More generally, a frame can be thought of as the combination of two fields that form an image.

Fields are typically referred to as odd and even, with odd field containing odd lines of a frame, and even fields containing even lines of a frame.

Analog television in North America is broadcast in accordance with the NTSC standard, and uses interlaced fields. The NTSC standard calls for about sixty (exactly 59.94) fields to be presented each second. Sequential fields are received and presented. The human eye perceives two sequential fields as a single frame.

Most cinema films are filmed at a rate of twenty-four images per second. Accordingly, cinema films have historically been converted for analog NTSC television using a process known as 3:2 pull-down. This conversion is more particularly illustrated in FIG. 1. As illustrated a sequence of film images, represented as frames ABCDE . . . is divided into even and odd fields, and one field of every second frame is repeated. The resulting field sequence is $A_OA_EA_OB_EB_OC_E$-$C_OC_ED_OD_EE_OE_EE_O$ . . . . Thus, fields from every second frame are presented in three fields, and fields formed from every second other frame are presented for only two fields. Twenty four frames are thus converted into sixty interlaced fields.

In Europe, analog television is transmit in accordance with the PAL or SECAM standards. These standards call for 50 interlaced fields per second. Cinema films are converted for analog PAL/SECAM television using a process known as 2:2 pull-down. This conversion is also illustrated in FIG. 1. As illustrated a sequence of film frames ABCDE . . . is used to form corresponding even and odd fields. Each even and odd field is shown once every second frame. The resulting field sequence is $A_OA_EB_OB_EC_OC_ED_OD_EE_OE_E$ . . . . Twenty four frames are thus converted into about fifty (i.e. forty eight) interlaced fields.

Newer television, computer and similar displays, however no longer display interlaced video. Instead such displays display the video progressively, one line after the next. Accordingly, newer video output devices, such as for example digital versatile disk (DVD) players, computer games and the like, output video progressively, line by line.

Often, video to be presented by such progressive scan devices comes from video provided as fields. For example, many DVDs still store video as fields of MPEG (or MPEG2) data, that must be de-interlaced. Moreover, many such sources store the video as fields in film mode (e.g. 3:2 pull-down or 2:2 pull-down). Progressive scan devices must be able to accurately assemble progressive scan frames from the interlaced data. They must therefore be able to detect the field sequence (often referred to as cadence) to correctly combine the fields to form frames. To this end, many sources (such as DVDs) are coded with flags that are intended to indicate whether stored video is stored in film mode or not. Unfortunately, video is often poorly edited: video is cut apart and reassembled in a way that destroys or alters the sequence. Similarly, video is often transferred or broadcast without these flags. In short, the flags cannot be relied upon.

As a result, other field sequence detectors (or cadence detectors) are known. Some detectors compare the difference between pixels in adjacent fields. If the source video is stored in film mode, the differences will follow a predictable pattern. Many of these detection circuits, however, cannot robustly distinguish between noise, slow movements, content that overlays interlaced and film mode material, high frequencies, and conventional interlaced content.

Other techniques include the analysis of motion vector data from field to field. Such techniques, however, are quite complex.

Accordingly, there remains a need for a field sequence detector and method that can easily and quickly detect the presence of film mode video.

SUMMARY OF THE INVENTION

In accordance with an aspect of the present invention, a field sequence detector determines the field sequence of multiple fields of video by assessing the vertical frequency content of hypothetical de-interlaced images. Hypothetical images are formed from a currently processed field and an adjacent (e.g. previous or next) field. If the vertical frequency content in the hypothetical image is relatively high (e.g. above ½ the Nyquist frequency for the image), the hypothetical image is assessed to contain artefacts, and is likely formed of fields belonging to different frames. If the frequency content is relatively low, the hypothetical image is assessed to be properly assembled from two complementary fields of the same frame. The field sequence in the series of fields may be determined using the assessed frequency content for several fields.

In accordance with an aspect of the present invention, there is provided a method of detecting a field sequence of a series of fields of video. The method includes: processing each of the series of fields by assessing the frequency content along the vertical direction of a first hypothetical image formed by interleaving alternating rows from the currently processed field and rows from an adjacent field, to determine the presence of high frequency vertical artefacts in the first hypothetical image; and detecting the field sequence in the series of fields, from the sequence of first hypothetical images determined to have high frequency vertical artefacts.

In accordance with another aspect of the present invention, there is provided a detector for detecting a field sequence of a series of fields of video. The detector includes: a first frequency analyzer for assessing vertical frequency content in first hypothetical images formed by interleaving alternating rows from a currently processed field and rows from an adjacent field; a processor in communication with the first frequency analyzer to determine the sequence of the series of fields, from the assessed vertical frequency content for several currently processed fields of the series of fields.

In accordance with yet another aspect of the present invention, there is provided a device for detecting a field sequence of a series of fields of video. The device includes: means for processing each of the series of fields to construct at least a portion of a first hypothetical image formed by interleaving alternating rows from the currently processed field and rows from an adjacent field; means for assessing the frequency content along the vertical direction of the first hypothetical image to determine the presence of high frequency vertical artefacts in the first hypothetical image; and means for detecting the field sequence in the series of fields, by analyzing the assessed frequency content for several of the series of fields.

In accordance with yet another aspect of the present invention, a method includes, for each field of a plurality of video fields, constructing at least a portion of an associated hypothetical image formed by interleaving rows from the field and rows from an adjacent field in the plurality of video fields; assessing the frequency content along the vertical direction of each of the associated hypothetical images to determine the presence of high frequency vertical artefacts therein; determining a field sequence in the plurality of fields from the sequence of those associated hypothetical images determined to have high frequency vertical artefacts.

In accordance with yet another aspect of the present invention, there is provided a method of processing a series of fields of video. For each of the fields, frequency content along the vertical direction of an associated hypothetical image formed by interleaving alternating rows from the field and rows from an adjacent field is assessed. Each of the associated hypothetical images is classified as having or not having high frequency vertical artefacts based on the assessing.

Aspects of the invention may be embodied as computer readable instructions stored on a computer readable medium.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention, FIG. 1 schematically illustrates the encoding of film frames, to a sequence of interlaced film mode (3:2 pull-down and 2:2 pull-down) fields.

DETAILED DESCRIPTION

Figure 1:
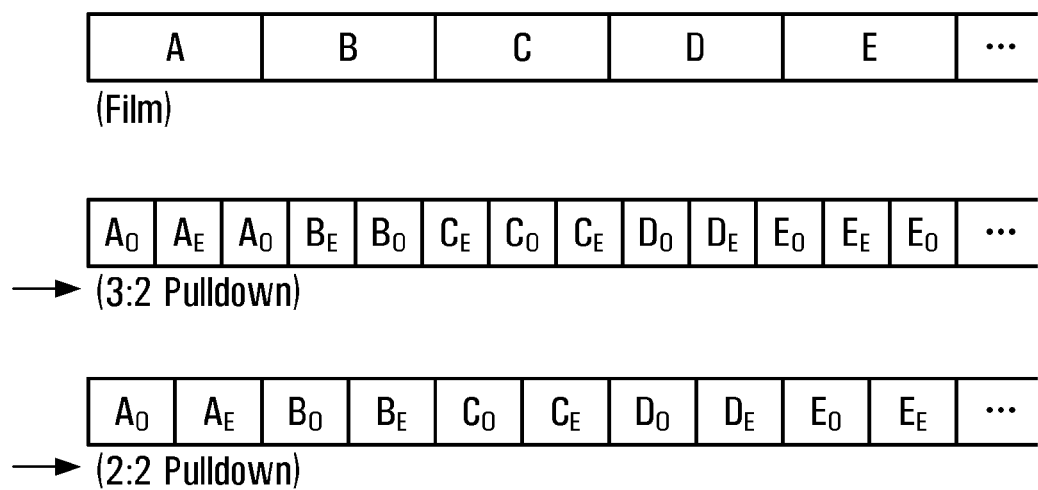
Figure 2:
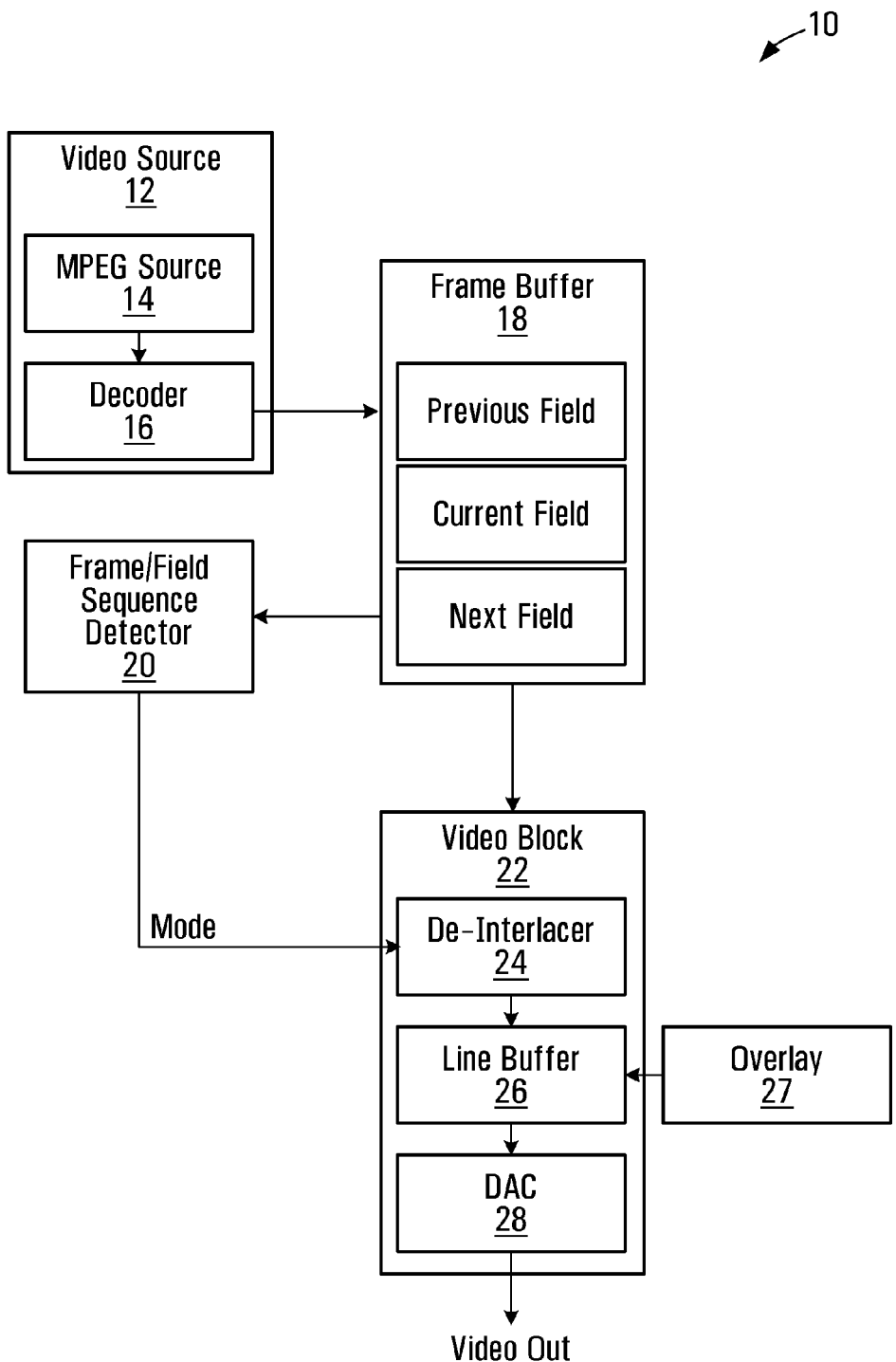
FIG. 2 is a simplified schematic block diagram of a video device including a field sequence detector, exemplary of an embodiment of the present invention.

FIG. 2 illustrates a video device 10 for generating a progressive scan video output signal. Video device 10 includes a field sequence detector 20, exemplary of embodiments of the present invention. Video device 10 may be any device suited to decode and/or present digital video. Device 10 may, for example, be a computing device, a television, a set-top box for receiving cable, satellite, broadcast or similar video signals, a DVD player, or the like.

As will become apparent, field sequence detector 20 determines if adjacent fields of a series of fields likely originate with the same or different frames. Sequence detector 20 relies on the observation that combining fields of different frames typically results in images having high frequency artefacts in the vertical direction, while combining complementary fields from the same frame does not result in such artefacts.

As illustrated, video device 10 includes a video source 12 of digitized video providing a sequence of video fields to a frame buffer 18. In the embodiment of FIG. 2 video source 12 provides decoded video stored, for example, as MPEG 1 or 2 video originating with MPEG source 14. MPEG source 14 may, for example, be a source of MPEG encoded video, and may for example be a DVD, read by an appropriate reader. MPEG source 14 could similarly be a demodulated MPEG stream carried by a satellite or cable television signal, or digital broadcast television signal. Decoder 16 decodes the digital stream into rasterized video frames or fields. For example, for interlaced sources, decoder 16 decodes interlaced video into odd and even fields and provides these fields to frame buffer 18.

Of course, this invention may be equally applicable to video that is not from an MPEG other than a DVD. For example, video could be formatted as MPEG 4; H.264; Quicktime. Video source 12 could provide a digitized version of an analog video source such as a video cassette recorder. Any audio associated with video source 12 may be separately extracted and amplified in a conventional manner, not detailed herein.

In any event, the output of video source 12 is provided as fields of rasterized video to frame buffer 18. Field sequence detector 20 is interconnected with frame buffer 18 and video block 22.

As illustrated, video block 22 includes a de-interlacer 24, a line buffer 26, an overlay generator 27, and a digital to analog converter (DAC) 28. Video block 22 converts pixel data in frame buffer 18, line by line into an analog output for display on a display such as a computer monitor, television, or the like. Data in the line to be converted by the DAC is stored within line buffer, where it may be scaled or overlayed with additional video information, in conventional ways understood by those of ordinary skill. Data provided to the line buffer 26 is provided from frame buffer 18 by de-interlacer 24. Additionally, overlays in the form of graphics, subtitles or the like may be generated by overlay generator 27.

De-interlacer 24 governs the order in which lines of video within frame buffer 18 are converted to analog video. The mode of operation of de-interlacer 24 is controlled by field sequence detector 20. In an alternate embodiment, video block 22 may output digital data directly without a DAC to drive a pixel-based digital display (such as an LCD, digital light processing (DLP) display, or the like).

As noted, odd fields contain odd lines of the video frame, while even fields contain even lines of the video frame. Frame buffer 18 stores at least three fields at any given time: the fields may be considered previous, current and next fields. Preferably, frame buffer 18 operates first-in, first out: each time a new field arrives from video source 12, an old one is discarded, while previous, current and next fields are stored at the same locations, field after field. As will become apparent, de-interlacer 24 assembles frames of progressive video to be provided to DAC 28 from current and next fields, or current and previous fields.

Decoder 16, frame buffer 18, display block 22 and film sequence detector 20 may each be formed using conventional semiconductor design and production techniques appreciated by those of ordinary skill.

Figure 3:
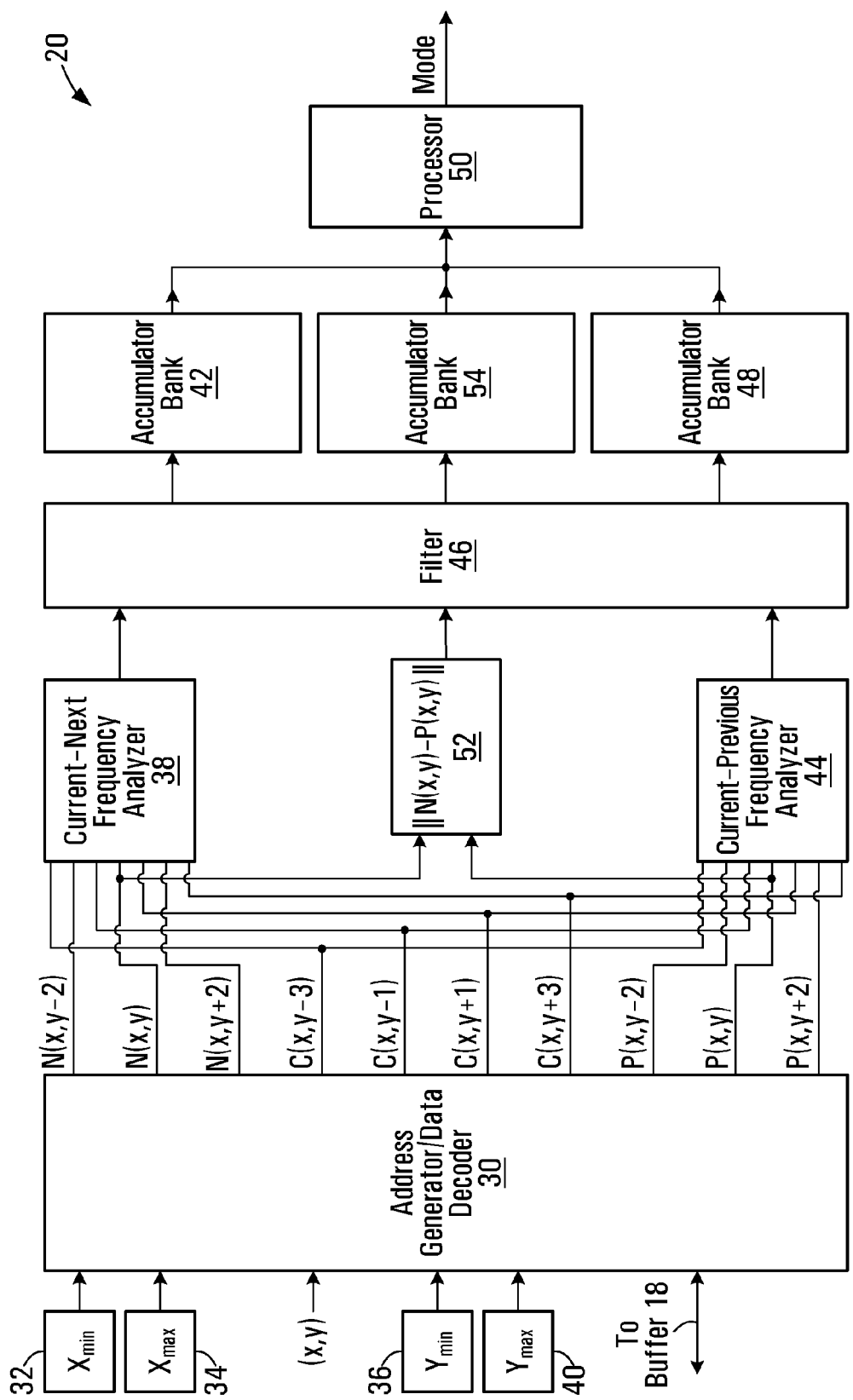
FIG. 3 is simplified schematic block diagram of the field sequence detector of FIG. 2.

FIG. 3 further illustrates field sequence detector 20, exemplary of embodiments of the present invention (and frame buffer 18).

As illustrated, field sequence detector 20 includes an address generator/data decoder 30, for generating pixel values at addresses within frame buffer 18 to be processed as described below. The pixel values typically represent the color and/or intensity of the pixels.

Field sequence detector 20 relies on the frequency content in the vertical direction of hypothetical images formed by interleaving alternating lines from adjacent fields—the current and previous field, and/or hypothetical images formed by images alternating lines current and next field video. If hypothetical images contain high frequency artefacts, the corresponding source fields likely originate with different frames, and should not be combined to form a de-interlaced image.

In one embodiment, the frequency content in a vertical direction within the hypothetical images is assessed. Specifically, the frequency content in a vertical direction around all or numerous pixels in the hypothetical images are determined, to classify the hypothetical image as having relatively high (H) or low (L) vertical frequency.

To this end, in a first embodiment, address generator/data decoder 30 sequentially generates the values within a column about a pixel of interest, in a hypothetical image formed by combining current and adjacent fields. That is, for each pixel having co-ordinates (x,y) within a hypothetical image, address generator/data decoder 30 generates ten addresses and corresponding pixel values from current, next and previous fields: the address within buffer 18 of the pixel $P_A(x,y)$ within the immediately previous field (corresponding to the pixel $F(x,y)$ in the hypothetical image/frame) and the pixel value $P(x,y)$; address $N_A(x,y)$ and pixel value $N(x,y)$ in the immediately subsequent (i.e. next) field, as well as the addresses of the pixels directly above and below the pixel in the current field, the previous field, and the next field.

The addresses (denoted by subscript A) of the pixels may be represented mathematically as,

| | | |
|---|---|---|
| $P_A(x, y-2)$ | $= F_{CPA}(x, y-2)$ | |
| $P_A(x, y)$ | $= F_{CPA}(x, y)$ | |
| $P_A(x, y+2)$ | $= F_{CPA}(x, y+2)$ | |
| $N_A(x, y-2)$ | $= F_{CNA}(x, y-2)$ | |
| $N_A(x, y)$ | $= F_{CNA}(x, y)$ | |
| $N_A(x, y+2)$ | $= F_{CNA}(x, y+2)$ | |
| $C_A(x, y-3)$ | $= F_{CNA}(x, y-3)$ | $= F_{CPA}(x, y-3)$ |
| $C_A(x, y-1)$ | $= F_{CNA}(x, y-1)$ | $= F_{CPA}(x, y-1)$ |
| $C_A(x, y+1)$ | $= F_{CNA}(x, y+1)$; | $= F_{CPA}(x, y+1)$ and |
| $C_A(x, y+3)$ | $= F_{CNA}(x, y+3)$ | $= F_{CPA}(x, y+3)$ | where (x,y) represent coordinates within a hypothetical image/frame; P, N and C represent the previous, next and current fields; $F_{CN}$ represents a hypothetical image formed by combining the current field with the next field; and $F_{CP}$ the current field with the previous field. Notably, for convenience, addresses are expressed with reference to a constructed image/frame. Co-ordinates could similarly be expressed as coordinates within the fields P, N and C.

Address generator/data decoder 30 further outputs the values of buffer 18 at the generated addresses. To do so, address generator/data decoder 30 may further include a buffer (not shown) to store data within frame buffer 18, at the identified pixel addresses. Pixel values at the ten generated addresses may be read by address generator/data decoder 30 from frame buffer 18 sequentially.

Now, using pixels within buffer 18 at the identified addresses, it is possible to reconstruct a portion of a column in hypothetical image $F_{CN}$ or $F_{CP}$, representative of a possible de-interlaced frame. For example, the pixel sequence $C(x,y-3); P(x,y-2); C(x,y-1); P(x,y); C(x,y+1); P(x,y+2); C(x,y+3)$ represents a column of seven pixels, within a hypothetical image $F_{CP}$ constructed from the previous and current field, centered about the pixel at co-ordinate (x,y).

Similarly, the pixel sequence $C(x,y-3); N(x,y-2); C(x,y-1); N(x,y); C(x,y+1); N(x,y+2); C(x,y+3)$, represents a portion of a column, within a hypothetical image $F_{CN}$ constructed from current and next field, centered about the pixel at co-ordinate (x,y).

Field sequence detector 20 further includes two frequency analyzers: current and previous field (CP) frequency analyzer 44; and current and next field (CN) frequency analyzer 38. Each frequency analyzer 38, 44 performs a frequency analysis on a provided sequence of pixel values. In the depicted embodiment, frequency analysis is performed by each analyzer 38, 44 using seven vertically aligned pixels within an image. Of course, more or fewer pixels could be used for frequency analysis.

Specifically, frequency analyzer 38 performs a frequency analysis on the pixel sequence, $C(x,y-3); P(x,y-2); C(x,y-1); P(x,y); C(x,y+1); P(x,y+2); C(x,y+3)$ at addresses $C_A(x,y-3); P_A(x,y-2); C_A(x,y-1); P_A(x,y); C_A(x,y+1); P_A(x,y+2); C_A(x,y+3)$ within buffer 18.

Analyzer 44 performs frequency analysis on the pixel sequence $C(x,y-3); N(x,y-2); C(x,y-1); N(x,y); C(x,y+1); N(x,y+2); C(x,y+3)$ at addresses $C_A(x,y-3); N_A(x,y-2); C_A(x,y-1); N_A(x,y); C_A(x,y+1); N_A(x,y+2); C_A(x,y+3)$, within buffer 18.

As will become apparent, each frequency analyzer 38, 44 may perform a fast Fourier, discrete Fourier, wavelet, discrete wavelet or similar frequency analysis of the values of the provided pixel sequence.

Figure 4A:
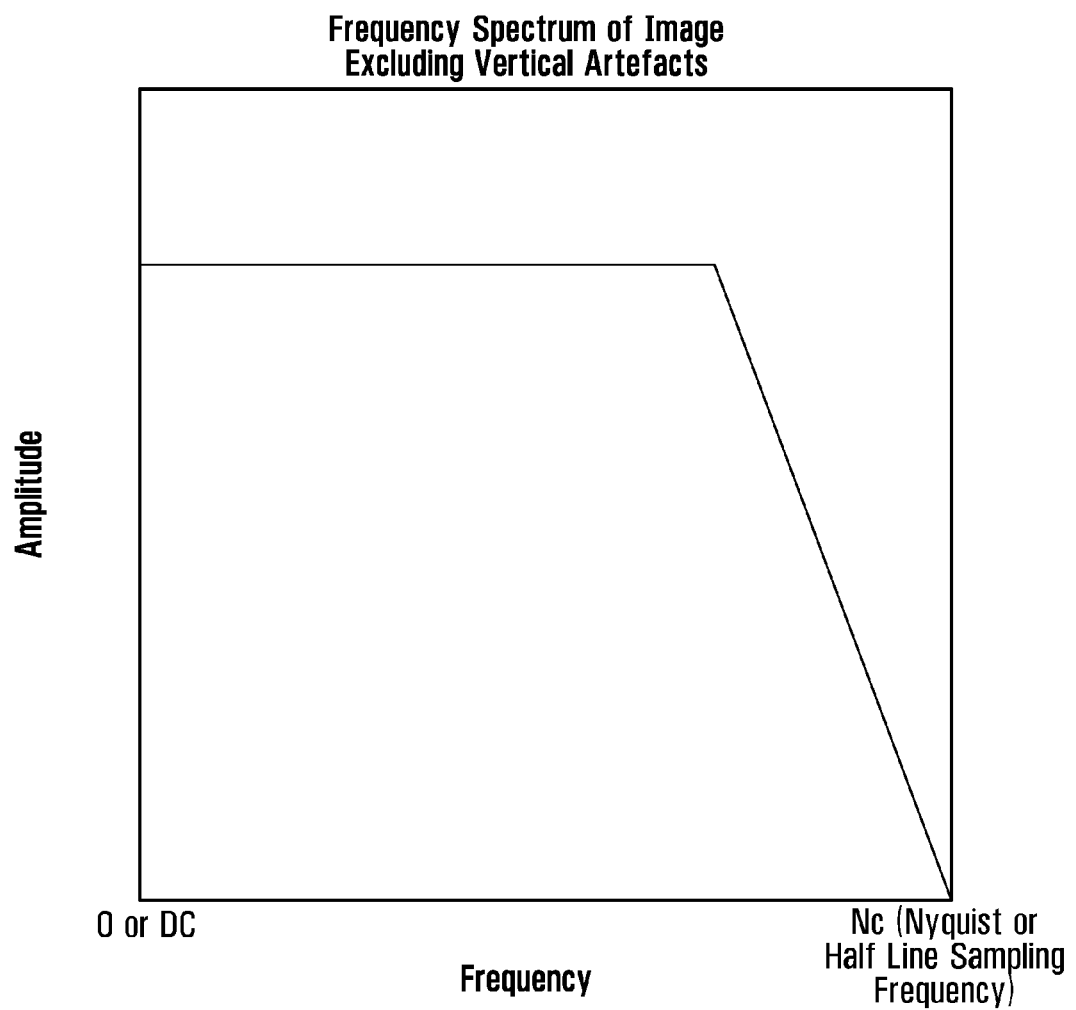
FIGS. 4A and 4B are spectra of images excluding and including vertical artefacts, respectively.
Figure 4B:
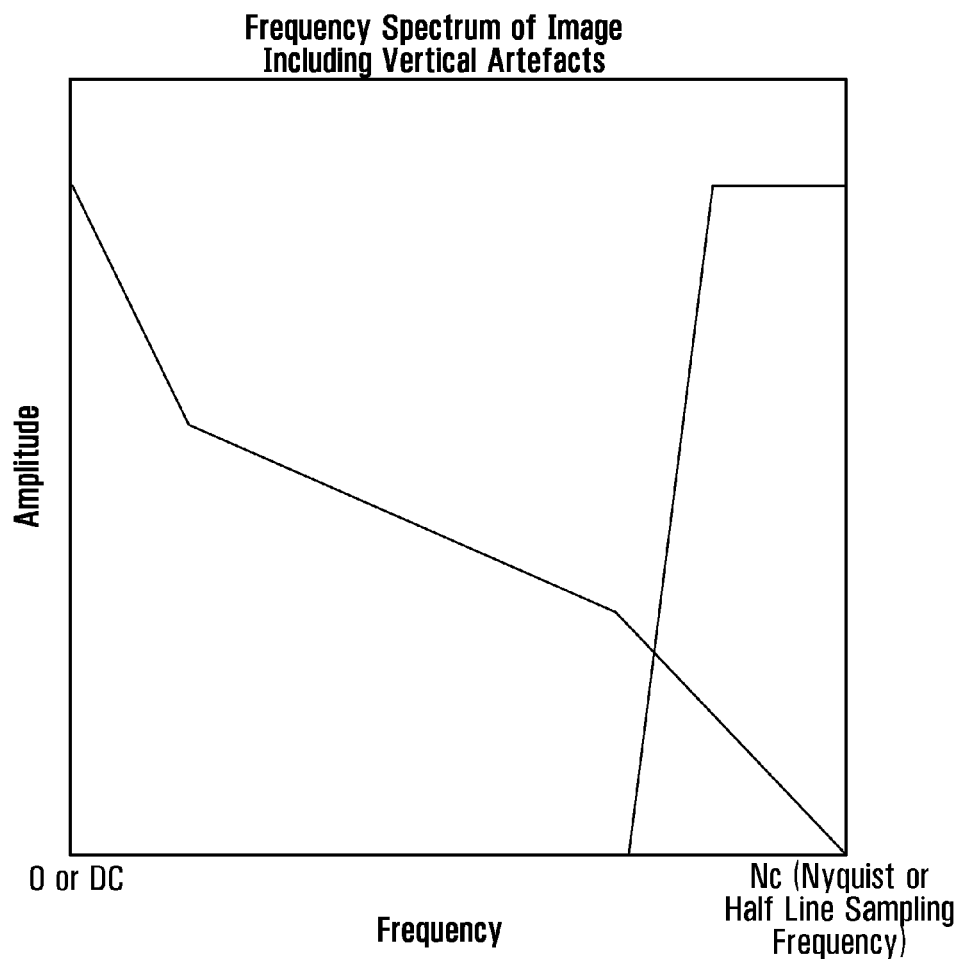

Notably, an image formed by interlacing two fields originating with two different frames typically results in visible artefacts often described as a "combing pattern", "mice teeth", "tearing", "feathering", or "serrations". The frequency content of a sequence of vertical pixels having such artefacts is generally quite high, and typically exhibits distinct characteristics. Conversely, the frequency content in a column of pixels of an image formed of even and odd fields of the same frame is relatively low. Specifically, FIGS. 4A and 4B show the vertical frequency content of representative images without and with vertical artefacts, respectively. Notably, the frequency content at frequencies greater than ¼ the sampling frequency (i.e. Nyquist/2) is more pronounced for images including the vertical artefacts (FIG. 4B), than for images that do not include such artefacts (FIG. 4A).

Detector 20 takes advantage of the frequency content of hypothetical images formed of adjacent fields, to detect field sequences, such as 3:2 pull-down; 2:2 pull-down or other field sequences.

Now, each analyzer 38, 44 outputs a metric of the spectral quality of the analyzed pixels. In the depicted embodiment, the metric calculated by each analyzer 38, 44 is the amplitude of the dominant frequency component having a frequency greater some threshold frequency (typically ¼ the sampling frequency or the Nyquist frequency/2). Analyzers 38, 44 may do this by locating the local maximum of the portion of the spectrum above this threshold frequency, and outputting the associated amplitude.

Additionally, analyzers 38, 44 may further optionally verify that this local maximum does likely represent the dominant frequency, resulting from vertical artefacts. To do so, analyzers 38, 44 may verify that the vertical frequency content proximate the pixel of interest (x,y), approximates the vertical frequency characteristics of a hypothetical image including artefacts. Specifically, as illustrated in FIG. 4B, the frequency content attributable to vertical artefacts, only manifest itself at frequencies in the upper half of the frequency spectrum. Further, the amplitude of the associated frequencies is generally increasing. This spectral pattern has been found to be a fingerprint of the "weaving" artefact, described. Thus, analyzers 38, 44 may additionally verify that this, or a similar, fingerprint is present for each pixel of interest. Analyzers 38, 44 may accomplish this by determining that the amplitude of the spectral content is generally increasing between 0.5 and 0.75 of the Nyquist frequency. Alternatively, analyzers 38, 44 may determine that the local maxima in the spectral regions of 0.5-0.625, 0.625-0.75 and 0.75-875 of the Nyquist frequency are increasing. Other techniques are possible. In any event, if analyzers 38, 44 fail to verify the presence of the fingerprint, they may output a value of "0", otherwise the maxima of the spectral content in the top half of the spectrum may be output.

An additional difference calculator 52, calculates the absolute difference between the pixel at co-ordinate (x,y) in the next image N, and previous image, P.

Processor 50 is in communication with analyzers 38 and 44, and difference calculator 52 by way of filter 46 and accumulator banks 42, 48, and 50 to read outputs of analyzers 38 and 44, and difference calculator 52 to assess the frequency content of each hypothetical image and detect a field sequence. Broadly, processor 50 assesses the frequency content to classify the hypothetical images as containing high frequency content (H) expected as a result of artefacts, or lower frequency content, expected in properly formed images.

Filter 46 may remove or smooth data that is not in-line with previously generated data by averaging or otherwise filtering frequency metrics for multiple adjacent pixels.

For each current field, the output of filter 46 is provided to accumulator banks 42, 48. Accumulator banks form a cumulative histogram reflecting the outputs of frequency analyzers 38, 44 for each hypothetical image for an entire current field. As will become apparent, accumulator banks 42 and 48 count the number of analyzed pixels for which frequency metrics fall within defined ranges, and thus provide a histogram of the cumulative frequency metric for the hypothetical image. As such, each accumulator bank 42, 48 may include multiple registers, one corresponding to each defined range. Specifically, accumulator banks 42 and 48 count the number of pixels for which the output metric of filter 38, 44 (i.e. amplitude of the dominant frequency above ¼ the sampling frequency) is within one of several ranges. The ranges may be empirically determined. Alternatively, the ranges may be dynamically updated by processor 50.

The output of difference calculator 52 is similarly output to accumulator bank 54. Accumulator bank 54 counts the number of pixels for which abs(N(x,y)−P(x,y)) is below a threshold.

Operation of processor 50 in manners exemplary of embodiments of the present invention is controlled through a series of processor executable instructions that may be loaded into instruction RAM/ROM or firmware (not specifically illustrated) associated with processor 50. The RAM/ROM may be external to processor 50 or integral therewith. Processor readable instructions may be loaded from a computer readable medium (not shown).

In the depicted embodiment, fields are processed sequentially. However, a person will realize that multiple fields could be buffered and processed. As illustrated, for each currently processed field (i.e. the $N^{th}$ field within a sequence) provided by video source 12, address generator/data decoder 30 generates sets of ten addresses for pixels within the current field. Sets of ten pixel addresses spanning at least a portion of each field are generated sequentially. Address generator/data decoder 30 accordingly generates sets of ten addresses for each (x,y) coordinate provided to address generator/data decoder 30.

For each current field, addresses for multiple (x,y) co-ordinates, between $(x_{min}, y_{min})$ and $(x_{max}, y_{max})$ are generated. Values of $x_{min}$, $x_{max}$, $y_{min}$ and $y_{max}$ may be stored in registers 32, 34, 36 and 40, respectively. The values of $(x_{min}, y_{min})$ and $(x_{max}, y_{max})$ are typically fixed, and may be chosen to allow analysis of pixels within a representative region of each hypothetical image. In one embodiment $(x_{min}, y_{min})$ and $(x_{max}, y_{max})$ are chosen so that all pixels forming the image are analyzed. Of course, pixels within smaller representative regions could be analyzed. Similarly, non-continuous samples of the images could be used.

In the depicted embodiment, address generator/data decoder 30 generates, sets of data at addresses $C_A(x,y-3)$; $P_A(x,y-2)$; $C_A(x,y-1)$; $P_A(x,y)$; $C_A(x,y+1)$; $P_A(x,y+2)$; $C_A(x,y+3)$ and $C_A(x,y-3)$; $N_A(x,y-2)$; $C_A(x,y-1)$; $N_A(x,y)$; $C_A(x,y+1)$; $N_A(x,y+2)$; $C_A(x,y+3)$, for $x_{min} \leq x \leq x_{max}$, and $y_{min} \leq y \leq y_{max}$.

Frequency analyzer 44 uses the values of pixels at the generated addresses to determine frequency metrics, representative of the vertical frequency content at the various pixels, of a hypothetical image formed of the current ($N^{th}$) field, C, and previous ($(N-1)^{th}$) field P.

Frequency analyzer 38 similarly determines metrics, representative of the vertical frequency content at the various pixels, of a hypothetical image formed of the current ($N^{th}$) field C, and next ($(N+1)^{th}$) field N.

Difference calculator 52 calculates abs (N(x,y)−P(x,y)).

After the metrics for one pixel in each of the current-next field, and current-previous field hypothetical images have been determined by frequency analyzers 38 and 44, address generator/data decoder 30, may advance the row and then column address within the fields, for each hypothetical image, so that the vertical frequency about multiple pixels within the hypothetical image may be assessed. Filter 46 may filter frequency metrics associated with multiple adjacent pixels, to provide a frequency metric for each pixel in the hypothetical image.

Figure 5A:
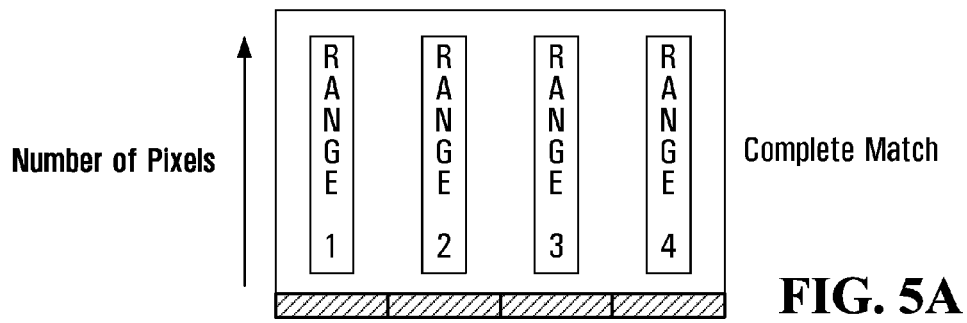
FIGS. 5A to 5D are histograms illustrating the distributions of pixels proximate high frequency vertical content for various hypothetical images.
Figure 5B:
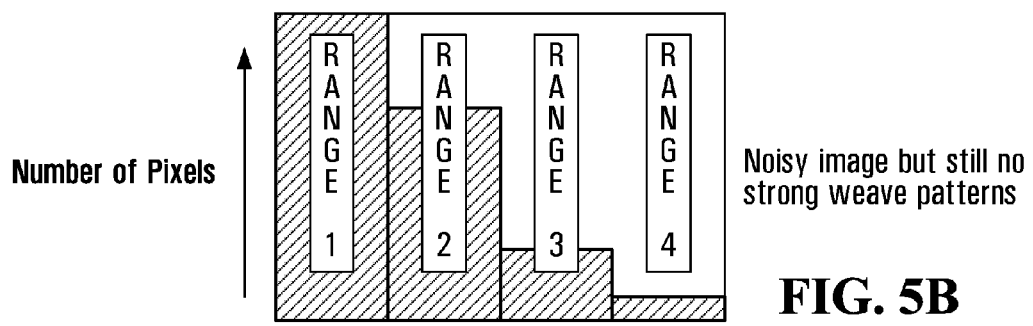
Figure 5C:
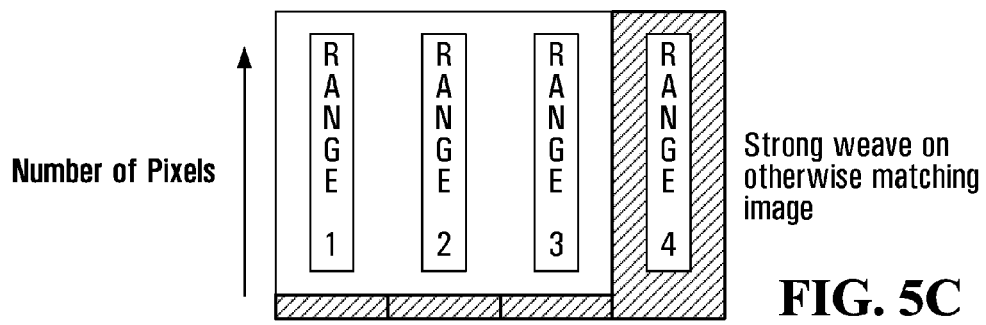
Figure 5D:
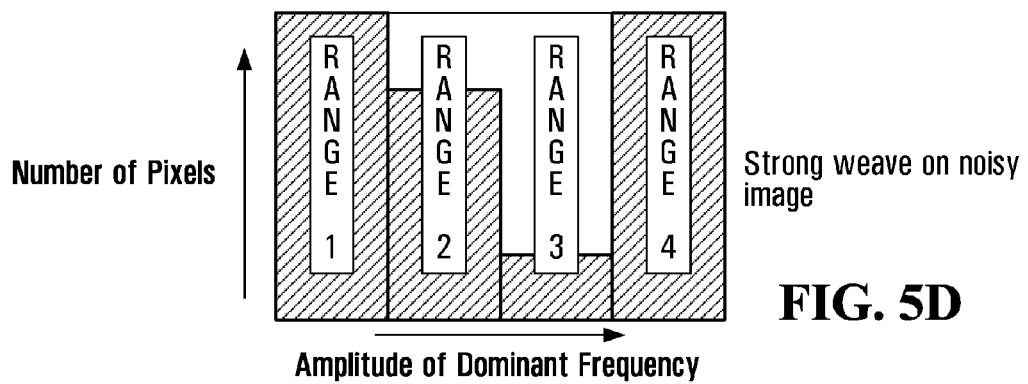

Accumulator banks 42, 48 and 54 are then updated to count the number of pixels having frequency metrics in defined ranges. Possible histograms for hypothetical images using four possible ranges (RANGE1, RANGE2, RANGE3, and RANGE4) are depicted in FIGS. 5A to 5D. As illustrated, images formed of complementary fields of the same frame should typically exhibit histograms as depicted in FIG. 5A or 5B, and may be assessed to have relatively low (L) vertical frequency content. Images exhibiting weave artefacts should exhibit histograms as depicted in FIG. 5C or 5D, and may be assessed to have relatively high (H) vertical frequency content.

Processor 50, in turn, is provided with metrics of the frequency content in the vertical direction of the two hypothetical images formed from the current and previous fields and the current and next field, for each current field, as stored in accumulator banks 42, 48. Processor 50 next tries to determine whether current and next or current and previous fields are best combined to form a de-interlaced image. To do so, processor 50 determines whether the histogram stored in accumulator banks 42 and 48 more closely resembles the histogram in FIG. 5A or 5B, or FIG. 5C or 5D, and the hypothetical images should be assessed to have relatively low (L) or high (H) vertical frequency content.

Optionally, the output of accumulator 54, storing the number of pixels in previous and current fields for which the difference is less than the threshold, may be used by processor 50 to better determine whether a histogram reflects high frequency artefacts, or merely reflects high frequencies present in the image. Specifically, if the difference value is zero (or near zero) for all (or nearly all) pixels in the addressed region, current-next field frequency assessment should be the same as current-previous field frequency assessment as determined for the immediately preceding processed field. Vertical high frequency content in the current-next field can then be assumed to be the result high frequency content in the original image, and not artefacts.

Notably, the contents of accumulator banks 42, 48 need not be exact, but rather only relative. That is, the contents of accumulator banks 42, 48 are only used to assess whether the frequency content in a vertical direction of hypothetical images is higher (denoted herein as H) than the anticipated frequency content (denoted herein as L) for properly de-interlaced images. Accordingly, any suitable technique may be used to assess whether a histogram for a particular hypothetical image more closely resembles FIG. 5A, 5B or FIGS. 5C, 5D, and classify the image. This may done by as simply as determining the fraction of pixels about which the dominant frequency in the vertical direction is in the highest amplitude segment, as counted by accumulator banks 42, 48 exceeding some threshold. In this case the hypothetical image may be assessed to have higher frequency content in a vertical direction (H) than the anticipated frequency content for a properly de-interlaced image.

Conveniently, values in accumulator banks 42, 48 may be further processed using past values of accumulator banks 42, 48. Specifically, once a hypothetical image has been determined to not contain artefacts, the corresponding histogram may be considered a template histogram, and may be used as a comparator or filter for future histograms. Histograms in accumulator banks 42, 48 for future hypothetical images, may be filtered by subtracting or otherwise applying the template histogram. The modified results better reflect content attributable to artefacts or noise.

Once frequency content in the vertical direction for hypothetical images for multiple current fields has been assessed, processor 50 may estimate the field sequence of the source, field by field. Specifically, for every current field, the hypothetical current-previous field image and current-next field image frequency assessments are compared to known patterns to determine the field sequence of the decoded image.

Figure 6:
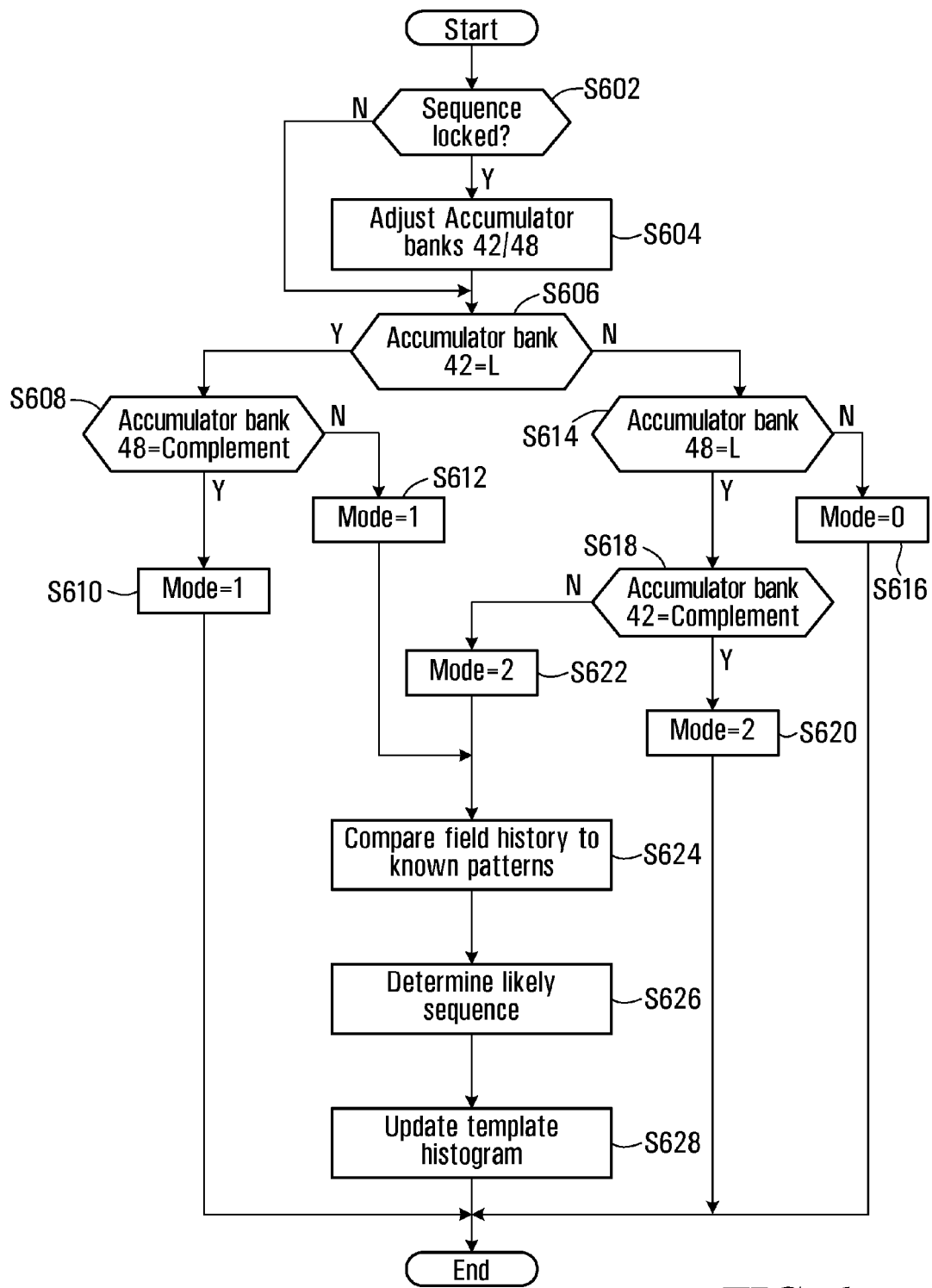
FIG. 6 is a flow chart illustrating steps performed by the field sequence detector of FIG. 3, exemplary of embodiments of the present invention.

For example, consider adjacent fields in a 3:2 pull-down sequence
$A_O A_E A_O B_E B_O C_E C_O C_E D_O D_E E_O E_E E_O F_E F_O \ldots$
The vertical frequency content of hypothetical images formed from current and previous fields will typically be
HLLHLHLLHLHLLHL . . .
Similarly, the vertical frequency content of hypothetical images formed from current and next fields will be
LLHLHLLHLHLLHL . . .
For adjacent fields in a 2:2 pull-down sequence
$A_O A_E B_O B_E C_O C_E D_O D_E E_O E_E F_O F_E \ldots$
the vertical frequency content in hypothetical images formed from current and previous fields will typically be
HLHLHLHLHLHL . . .
Likewise, the vertical frequency content of hypothetical images formed from current and next fields will be
LHLHLHLHLHL . . .
For adjacent fields in a 5:5 pull down sequence
$A_O A_E A_O A_E A_O B_E B_O B_E B_O B_E C_O C_E C_O C_E C_O D_E D_O D_E D_O D_E \ldots$
the vertical frequency content in hypothetical images formed of current and previous fields will be
HLLLLHLLLLHLLLLHLLL . . .
and of images formed of current and next (CN) fields
LLLLHLLLLHLLLLHLLLLHLLLL . . .
Similarly, for adjacent fields in a 8:7 pull down sequence
$A_O A_E A_O A_E A_O A_E A_O A_E B_O B_E B_O B_E B_O B_E B_O C_E C_O C_E C_O C_E C_O C_E C_O \ldots$
the vertical frequency content in hypothetical images formed of current and previous fields will typically be
HLLLLLLLHLLLLLLHLLLLLLLH . . . and of images formed of current and next (CN) fields
LLLLLLLHLLLLLLHLLLLLLLL . . .
More generally, for m:n pull-down sequence, the vertical frequency content in hypothetical images formed of current and next fields for multiple fields will be
$(L)_{m-1} H(L)_{n-1} H(L)_{m-1} H(L)_{n-1} \ldots$
and the vertical frequency content in hypothetical images formed of current and previous fields will be
$H(L)_{m-1} H(L)_{n-1} H (L)_{m-1} H(L)_{n-1} \ldots$
Similarly, for a m:n:l:k pull-down sequence (like, for example, 2:4:4:2, 2:3:3:2, 2:3:2:3:2:2 sequences), the vertical frequency content in hypothetical images formed of current and next fields will be
$(L)_{m-1} H(L)_{n-1} H(L)_{l-1} H(L)_{k-1} H(L)_{m-1} \ldots$
and the vertical frequency content in hypothetical images formed of current and previous fields will be
$H(L)_{m-1} H(L)_{n-1} H(L)_{l-1} H(L)_{k-1} H(L)_{m-1} \ldots$
Using vertical frequency values for current and next field and current and previous field hypothetical images, processor 50 detects three possible modes:

mode 0=pull-down mode not detected; switch to de-interlacing;

mode 1=weave current field to next field to form frame; and mode 2=weave current field to previous field to form frame Steps S600 performed by processor 50 to detect a field sequence are detailed in FIG. 6. Specifically, processor 50 may initially detect the mode by determining whether the current-next or current-previous field contains artefacts, by analysing the content of accumulator bank 42 (or 48) in steps S606-S622. As described, the histogram stored in one or both of accumulator bank 42 (or 48) may be compared to known histograms, to determine whether current and next, or current and previous fields may be combined, and thus whether mode 1 or 2 should be used. If the current and next field accumulator 42 indicates low frequency vertical content (L), mode 1 may be selected (S608-S612). If the current and previous field accumulator 48 indicates low frequency vertical content (L), mode 2 may be selected (S608-S612). Optionally, the values in accumulator bank 42 (or 48) may be adjusted prior to comparison using template histogram values for a properly de-interlaced image, as described above, if available in step S602 and S604.

Additionally, an indicator of the vertical frequency content for multiple images may be buffered. After the indicator (H or L) for multiple fields has been buffered, 3:2, 2:2 or other pull-down sequence may be detected in step S624. Specifically, if high frequency vertical content is assessed in hypothetical images for two non-adjacent fields in every five fields (i.e. the pattern . . . HLLHLHLLHLHLLH . . . ) a 3:2 sequence may be detected. Likewise if the pattern . . . HLHLHLHLHLHL . . . , a 2:2 pull-down sequence may be detected.

Once a known field sequence has been determined, consistency of the mode determined in step S624 and S626 may be verified in step S608 and S614 using the other accumulator banks 48 (or 42) for each field. That is, an assessment is made to ensure the complementary pattern ( . . . LLHLHLLHLHLL . . . for 3:2 pull-down; . . . LHLHLHLHL . . . for 2:2 pull-down) has been generated by the other analyzer 44, 38. If not, the current pull-down sequence may be re-verified in steps S624-S628. The selected mode for the field may still be based on which of banks 42 and 48 indicate low frequency content, or optionally mode 0 may be assumed.

Steps S624, S626 and S608, S614 may similarly detect and verify a variety of other field sequences, including but not limited to 5:5 pull-down; 8:7 pull-down; edited 3:2 pull-down; and the like.

Once a known pull-down sequence is recognized and verified, processor 50 may update the template histogram used in step S604 in step S628, using the contents of accumulator banks 42 or 48 for a hypothetical image without artefacts.

Conveniently, the output of frequency analyzers 38 and 44 and accumulator banks 42 and 48 may be quite sensitive to poor editing, (e.g. added commercials, cut scenes due to film ratings, etc), still images with changing subtitles, wrongly inserted scene changes, artificial field/frame drops to reduce running time, or other anomalies to the film mode sequence.

Figure 7A:
FIGS. 7A and 7B illustrates weave patterns for de-interlacing exemplary fields in 3:2 pull-down and 2:2 pull-down field sequences.
Figure 7B:

In any event, after mode detection, an indicator of the detected mode is provided by detector 20 to de-interlacer 24. De-interlacer 24 accordingly assembles frames for display from odd and even fields in buffer 18 for presentation on a progressive scan video display. As noted, in mode 1 de-interlacer 24 weaves the current field with the next field in buffer 18 to form the progressive frame. In mode 2, de-interlacer 24 current field with the previous field to form the frame. In mode 0, video is de-interlaced in a conventional manner. For example, adjacent fields may be weaved and/or interpolated (bobbed) together, using conventional de-interlacing techniques understood by those of ordinary skill. Exampling de-interlacing modes for 3:2 and 2:2 pull-down sequences are depicted in FIGS. 7A and 7B, respectively.

Even more generally, detector 20 may be used to detect frame repetition sequences in a sequence of non-interlaced frames. Such a frame repetition sequence may, for example, manifest itself in progressive scan frames formed from 3:2 pull-down or 2:2 pull-down sources. Similarly, frames may be repeated in animated or computer generated frames. Knowledge of the frame sequence may be used to more effectively convert between frame rates, by taking into account the repetition of frames in the video source.

In order to use detector 20 to detect frame sequences, detector 20 is provided with fields that would be formed from adjacent frames. For example, even lines of current frame, odd lines of the previous and next frames may be stored in, or extracted from, frame buffer 18. Detector 20 would continue to operate as described above. Analyzers 38 and 44 would thus assess frequency content in hypothetical images formed from previous-current, and current-next frames. Low frequency content would be indicative of hypothetical images formed from the same frame, and therefore frame repetition, while high frequency content would be indicative of hypothetical images formed from different frames. Post frequency-content assessment processing could then determine frame repetition, for frame rate conversion and optional interpolation.

Although the above depicted embodiment generally relies on the use of two frequency analyzers 38 and 44 and accumulator banks 42 and 48, it should now be apparent that a variant of the detector could be formed using only a single analyzer 38 or 44 and associated accumulator bank 42 or 48. Only current-previous field hypothetical images or current-next hypothetical images would be analyzed. Verifications in steps S606-S608 would thus be eliminated. Such a detector would likely function as described, but would likely not be as robust, and may not work for some peculiar field sequences.

Additionally, although the described embodiments rely on the use of histograms to more accurately determine the vertical frequency content of each hypothetical image, a person of ordinary skill will appreciate that use of such histograms is not necessary and may be varied. For example, if each frequency analyzer 38, 44 can accurately assess whether the vertical spectral content for a particular pixel does or does not represent the presence of a "weaving" artefact, analyzers 38, 44 could simply output a binary value for each pixel, reflective of whether or not the artefact was present near the pixel. By simply counting the number of pixels reflective of the artefact, processor 50 may assess whether the artefact is likely present image. Of course, as the output of analyzers 38, 44 becomes more binary, analyzers 38, 44 should be more precisely able to determine frequency content. The use of histograms, thus allows for more qualitative, less exact, outputs from analyzers 38, 44. In a further alternate embodiment, the raw output of frequency analysers 38, 44 could be stored for each pixel for further processing by processor 50. In this way, a three dimensional frequency profile of each hypothetical image would be generated, for analysis by processor 50. Using this profile, processor 50 may assess the frequency content of hypothetical images.

Although the above embodiments have been depicted in the context of a programmable processor 50 and associated hardware frequency analyzers 38 and 44 and accumulator banks 42 and 48, a person of ordinary skill will readily appreciate that methods exemplary of embodiments of the invention could readily be embodied entirely in software, and stored on a computer readable medium. Similarly, processor 50 and associated software could be replaced partially or entirely with hardware.

Of course, the above described embodiments are intended to be illustrative only and in no way limiting. The described embodiments of carrying out the invention are susceptible to many modifications of form, arrangement of parts, details and order of operation.

The invention, rather, is intended to encompass all such modification within its scope, as defined by the claims.

What is claimed is:

1. A detector for detecting a field sequence of a series of fields of video, said detector comprising:
  a first frequency analyzer for calculating a first metric of vertical frequency content proximate individual pixels in each of a sequence of first hypothetical images formed by interleaving alternating rows from a currently processed field and rows from an adjacent field;

an accumulator bank in communication with said first frequency analyzer to store a distribution of values of said first metric of vertical frequency content, said distribution comprising a value of said metric for each one of a plurality of said individual pixels; and a processor in communication with said first frequency analyzer to determine said sequence of said series of fields, from said distribution for several currently processed fields of said series of fields, wherein said determining comprises classifying whether each hypothetical image has high frequency content in a vertical direction, based on said accumulator bank.

2. The detector of claim 1, further comprising an address decoder for decoding addresses of pixels in said currently processed field and said adjacent field to assess said vertical frequency content proximate said individual pixels.

3. The detector of claim 2, wherein said address decoder decodes addresses for selected ones of said individual pixels in a programmed range.

4. The detector of claim 1, wherein said first metric of vertical frequency content comprises a magnitude of a dominant frequency, above a threshold frequency, in said vertical frequency content proximate each ones of said individual pixels in said sequence of first hypothetical images.

5. The detector of claim 1, wherein said processor is further operable to adjust a content of said accumulator bank, to filter said content of said accumulator bank based on a distribution of said magnitudes for a hypothetical image without artefacts.

6. The detector of claim 1, wherein said first frequency analyzer analyzes hypothetical images formed by interleaving alternating rows from the currently processed field and rows from an immediately next field, said detector further comprising:

a second frequency analyzer for calculating a second metric of vertical frequency content proximate individual pixels in second hypothetical images formed by interleaving alternating rows from the currently processed field and rows from a previous field.

7. The detector of claim 6, wherein said first metric of vertical frequency content comprises a magnitude of a dominant frequency above a threshold frequency, proximate said individual pixels in said first hypothetical images; and said second metric of vertical frequency content comprises a magnitude of a dominant frequency above a threshold frequency, proximate said individual pixels in said second hypothetical images.

8. The detector of claim 7, wherein said first and second analyzers perform wavelet analyses.

9. The detector of claim 7, wherein said first and second analyzers perform Fourier analyses.

10. The detector of claim 7, further comprising a difference calculator for calculating the difference between pixels in said immediately next field and said immediately previous field.

11. A video device comprising a detector for determining a field sequence, formed in accordance with claim 7.

12. The detector of claim 1, wherein said processor is operable to detect a 3:2 pull down sequence in said series of fields, in response to determining relatively high distribution of values of vertical frequency content for two non-sequential ones of said first hypothetical images for every five of said currently processed fields.

13. The detector of claim 1, wherein said processor is operable to detect a 2:2 pull down sequence in said series of fields, in response to determining relatively high distribution of values of vertical frequency content for every alternating one of said series of fields.

14. A device for detecting a field sequence of a series of fields of video, said device comprising:

means for processing each of said series of fields to construct at least a portion of a first hypothetical image formed by interleaving alternating rows from the currently processed field and rows from an adjacent field;

means for calculating a metric of frequency content along the vertical direction of said first hypothetical image proximate individual pixels of said first hypothetical image to determine the presence of high frequency vertical artefacts in said first hypothetical image; and means for storing a distribution of values of said metric of vertical frequency content, said distribution comprising a value of said metric for each one of a plurality of said individual pixels;

means for detecting said field sequence in said series of fields, by analyzing said distribution of values for several of said series of fields, wherein said analyzing comprises classifying whether each hypothetical image has high frequency content in a vertical direction, based on said distribution of values.

15. A method comprising:

for each field of a plurality of video fields, constructing at least a portion of an associated hypothetical image formed by interleaving rows from the field and rows from an adjacent field in the plurality of video fields;

calculating a metric of frequency content along the vertical direction proximate a plurality of individual pixels of each of the associated hypothetical images and storing a distribution comprising a value of said metric for each one of said plurality of individual pixels to determine the presence of high frequency vertical artefacts therein;

classifying whether each hypothetical image has high frequency vertical artefacts based on said distribution; and determining a field sequence in the plurality of fields from the sequence of those associated hypothetical images determined to have high frequency vertical artefacts.

\* \* \* \* \*